(12) United States Patent  
Medvinsky et al.

(10) Patent No.: US 9,054,879 B2  
(45) Date of Patent: Jun. 9, 2015

(54) METHOD AND APPARATUS FOR DELIVERING CERTIFICATE REVOCATION LISTS

(75) Inventors: Alexander Medvinsky, San Diego, CA (US); Paul Moroney, Olivenhain, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 2701 days.

(21) Appl. No.: 11/455,574

(22) Filed: Jun. 19, 2006

(65) Prior Publication Data

US 2007/0294526 A1    Dec. 20, 2007

Related U.S. Application Data

(60) Provisional application No. 60/723,487, filed on Oct. 4, 2005.

(51) Int. Cl.
| | |
|---|---|
| H04L 29/06 | (2006.01) |
| H04L 9/32 | (2006.01) |
| H04N 21/235 | (2011.01) |
| H04N 21/254 | (2011.01) |
| H04N 21/258 | (2011.01) |
| H04N 21/435 | (2011.01) |
| H04N 21/436 | (2011.01) |
| H04N 21/835 | (2011.01) |

(52) U.S. Cl.
CPC ............ *H04L 9/3268* (2013.01); *H04N 21/235* (2013.01); *H04N 21/2541* (2013.01); *H04N 21/2585* (2013.01); *H04N 21/435* (2013.01); *H04N 21/43615* (2013.01); *H04N 21/835* (2013.01); *H04L 2209/601* (2013.01)

(58) Field of Classification Search
CPC ....................................................... H04L 9/3268
USPC .................................. 713/157, 158; 726/2–4
See application file for complete search history.

(56) References Cited

U.S. PATENT DOCUMENTS

| | | | | |
|---|---|---|---|---|
| 5,699,431 | A | * | 12/1997 | Van Oorschot et al. ........ 380/30 |
| 5,793,868 | A | * | 8/1998 | Micali ............................. 380/28 |
| 6,128,740 | A | * | 10/2000 | Curry et al. ................... 713/158 |
| 6,134,551 | A | * | 10/2000 | Aucsmith ............................ 1/1 |
| 6,466,162 | B2 | | 10/2002 | Boman |
| 6,525,690 | B2 | | 2/2003 | Rudow et al. |

(Continued)

OTHER PUBLICATIONS

Naor et al.; Certificate revocation and certificate update; Published in: Selected Areas in Communications, IEEE Journal on (vol. 18 , Issue: 4 ); pp. 561-570; Date of Publication : Apr. 2000; IEEE Xplore.*

(Continued)

*Primary Examiner* — Bradley Holder  
(74) *Attorney, Agent, or Firm* — Fox Rothschild LLP

(57) ABSTRACT

The present invention discloses an apparatus and method for delivering a revocation list over a one-way broadcast network to receivers with limited memory capabilities. In one example, the revocation list is partitioned to form a first certificate revocation list (CRL) sequence if the number of entries in the revocation list exceeds a predetermined value. Individual identification numbers belonging to a first identification number series are subsequently assigned to partitions of the first CRL sequence. Afterwards, the first CRL sequence is interleaved into a first content transport stream.

21 Claims, 2 Drawing Sheets

(56) References Cited

U.S. PATENT DOCUMENTS

| | | | | |
|---|---|---|---|---|
| 6,950,934 | B2* | 9/2005 | Kang et al. | 713/158 |
| 7,003,662 | B2* | 2/2006 | Genty et al. | 713/158 |
| 7,124,295 | B1* | 10/2006 | Zhao | 713/158 |
| 7,225,164 | B1* | 5/2007 | Candelore et al. | 705/57 |
| 7,356,693 | B2* | 4/2008 | Kivinen et al. | 713/158 |
| 7,373,503 | B2* | 5/2008 | Nakano et al. | 713/158 |
| 7,430,606 | B1* | 9/2008 | Meandzija et al. | 709/229 |
| 7,436,958 | B2* | 10/2008 | Ji et al. | 380/200 |
| 7,761,467 | B2* | 7/2010 | Xu et al. | 707/781 |
| 8,131,996 | B2* | 3/2012 | Durand | 713/158 |
| 2002/0004773 | A1* | 1/2002 | Xu et al. | 705/36 |
| 2002/0104000 | A1* | 8/2002 | Kang et al. | 713/158 |
| 2002/0178361 | A1* | 11/2002 | Genty et al. | 713/175 |
| 2003/0037234 | A1* | 2/2003 | Fu et al. | 713/158 |
| 2003/0084311 | A1* | 5/2003 | Merrien et al. | 713/191 |
| 2003/0105739 | A1* | 6/2003 | Essafi et al. | 707/1 |
| 2003/0149668 | A1* | 8/2003 | Lee et al. | 705/51 |
| 2003/0188117 | A1* | 10/2003 | Yoshino et al. | 711/164 |
| 2003/0217265 | A1* | 11/2003 | Nakano et al. | 713/158 |
| 2004/0064691 | A1* | 4/2004 | Lu et al. | 713/158 |
| 2004/0128504 | A1* | 7/2004 | Kivinen et al. | 713/158 |
| 2005/0210241 | A1* | 9/2005 | Lee et al. | 713/158 |
| 2005/0220304 | A1* | 10/2005 | Lenoir et al. | 380/255 |
| 2005/0246766 | A1* | 11/2005 | Kirkup et al. | 726/6 |
| 2005/0257046 | A1* | 11/2005 | Durand | 713/158 |
| 2006/0053494 | A1* | 3/2006 | Kamperman et al. | 726/27 |

OTHER PUBLICATIONS

Crépeau et al.; A certificate revocation scheme for wireless ad hoc networks; Published in: Proceeding SASN '03 Proceedings of the 1st ACM workshop on Security of ad hoc and sensor networks; pp. 54-61; 2003; ACM Digital Library.*

* cited by examiner

METHOD AND APPARATUS FOR DELIVERING CERTIFICATE REVOCATION LISTS

This application claims the benefit of U.S. Provisional Application No. 60/723,487 filed Oct. 4, 2005, which is herein incorporated by reference.

BACKGROUND OF THE INVENTION

1. Field of the Invention

Embodiments of the present invention generally relate to video-over-networks, e.g., video-over-Internet Protocol (IP) networks that utilize digital rights management functions for securely communicating content to network components. More specifically, the present invention relates to a method and apparatus for delivering a certificate revocation list (CRL) to a one-way client device over a broadcast one-way network.

2. Description of the Related Art

Digital content information has recently gained wide acceptance in the public. Such content includes, but is not limited to: movies, videos, music, and the like. Consequently, many consumers and businesses employ various digital media devices or systems that enable the delivery of such digital multimedia content via several different communication channels (e.g., a wireless satellite link or a wired cable connection). Similarly, the communication channel may be a telephony based connection, such as DSL and the like.

In addition to being used to deliver digital content, a communication channel may be used to distribute a certificate revocation list (CRL) to one-way client devices (e.g., a set top box (STB) that receives a broadcast and does not have an interactive connection to the infrastructure) located in a local network. Typically, a CRL is delivered over an IP network as a communication message that is distinguished from digital content information. This manner of distribution may be an inefficient use of network resources. Furthermore, two-way interactive communications are not available to all receivers, e.g., digital TV set-top boxes without a return channel. Additionally, CRLs may grow to be very large over time while a receiving client device may possess a limited amount of memory. Consequently, the memory may be quickly consumed in the attempt to handle such large CRL objects. Although an attempt to keep the CRLs small could be made, the overall effectiveness of the CRL distribution system may be compromised. For example, in an effort to minimize the size of CRLs, only Certificate Authority (CA) certificates are revoked. Therefore, when a CA certificate is revoked, all device certificates (compromised and uncompromised device certificates alike) issued by that CA are effectively invalidated.

Thus, there is a need in the art for a method and apparatus for delivering a CRL to a one-way client device to a local network.

SUMMARY OF THE INVENTION

In one embodiment, the present invention discloses an apparatus and method for delivering a revocation list. Specifically, the revocation list is partitioned to form a first certificate revocation list (CRL) sequence if the number of entries in the revocation list exceeds a predetermined value. Individual identification numbers belonging to a first identification number series are subsequently assigned to partitions of the first CRL sequence. Afterwards, the first CRL sequence is interleaved into a first content transport stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
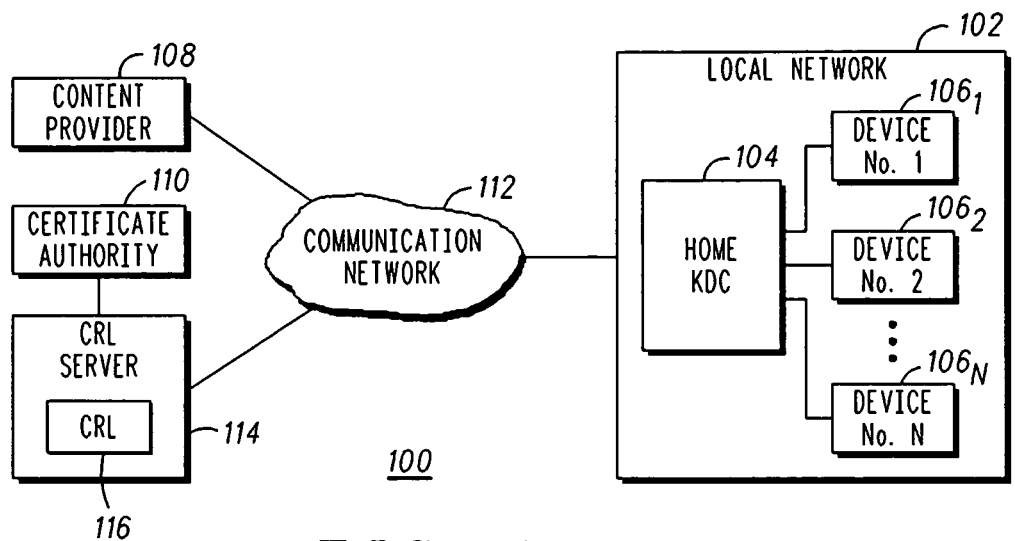
FIG. 1 depicts a block diagram of a system for facilitating the streaming of digital content over a communications network in accordance with the present invention.

FIG. 1 is a block diagram of a content distribution system 100 (e.g., an Internet Protocol rights management (IPRM) system) that utilizes an authenticated key management protocol (e.g., MOTOROLA ESBroker™ protocol) to facilitate the secure transfer of digital rights and content. In general, any secure content distribution system where the delivered content is persistently stored and consumed on one or more devices within the end user's network can be utilized.

In the event the content distribution system used by a content provider utilizes digital certificates, there is a need for end user devices to verify the revocation status of the digital certificates belonging to the content provider's servers. Furthermore, end user devices may legally exchange content in a protected manner, which commonly requires the local devices to verify each device's digital certificate. Therefore, end user devices also need to verify the revocation status of each device's certificate (e.g., deliver CRLs to those end user devices).

In one embodiment, the system 100 comprises a content provider 108 (e.g., a streaming server), a communications network 112 (e.g., the Internet), a certificate revocation license (CRL) server 114, and a local network 102. Although only one content provider 108, one CRL server 114, and one local network 102 are depicted, those skilled in the art realize that any number of content providers, CRL servers, or local networks may be included in the system 100.

The local network 102 may comprise a home network that includes a Home key distribution center (Home KDC) 104 and a plurality of client devices $106_1 \ldots _N$. The devices $106_1 \ldots _N$ may each comprise a set top box (STB), a digital video recorder (DVR), and the like. These devices may be used to provide digital content to viewing devices, such as a television, computer monitor, and the like. In one embodiment, client devices are one-way, although not limited to being one-way. That is, a one-way client device is capable of receiving communication messages (e.g., broadcast) but does not have an interactive connection to the infrastructure. For example, the infrastructure equipment may be responsible for generating a one-way MPEG-2 transport stream that is delivered as a digital broadcast over cable, satellite or a terrestrial network. While the infrastructure may support two-way communications for some client devices with a return channel capability, cheaper devices do not have the return channel and are only capable of receiving a one-way broadcast transport stream. At present, this is the scenario with most cable and satellite digital television networks. In addition, some two-way client devices may not use their interactive capability for all functions, and may instead process broadcast messages, particularly in a hybrid network consisting of both one-way and two-way devices.

The Home KDC 104 is typically a single device (e.g., a STB, a DVR, etc.) in a home network that is designated to function as a media gateway. The Home KDC 104 facilitates communication between the local network 102 and the other components of the system 100. In addition, the Home KDC 104 exchanges messages with the devices $106_{1...N}$ in order to register a client device 106, provide tickets needed to obtain content from a content provider 122, and the like. Similarly, the Home KDC 104 in an IPRM-protected domain is configured to process CRLs after an updated CRL sequence is received via broadcast from the CRL server 114.

The content provider 108 may comprise a streaming server that provides the digital content requested by the client devices $106_{1...N}$ (or the Home KDC 104). More specifically, the content provider 108 distributes encrypted content to the Home KDC 104 positioned in the local network 102 where the content is ultimately provided to the appropriate client device 106. In one embodiment, the content provider 108 may be configured to utilize caching servers (not shown) throughout the system 100 to distribute content to the local network(s).

The CRL server 114 may comprise a stand-alone server that obtains signed CRL files from a certificate authority (CA) server 110. Specifically, a Certificate Authority 110 is responsible for recording the serial number of a client device that is deemed to be compromised or when a client device's certificate is revoked for any reason. Specifically, the serial number of the device is recorded to a CRL 116. Once a CRL has been created and signed by a Certificate Authority, it can be safely transferred to a CRL server 114 with no additional security necessary. The CRL server 114 is capable of storing a plurality of CRLs in a database or other storage medium. Upon being notified that the CRL needs to be modified, the Certificate Authority updates the CRL sequence to include the additional compromised devices (or remove authorized devices). The updated CRL sequence is subsequently transferred to the CRL server 114 and broadcast to the local network 102.

A CRL sequence is repeated periodically at a configurable interval, e.g., once every few hours. The client devices $106_{1...N}$ are required to remain tuned in to the broadcast of the CRL. If the previously obtained CRL has expired and a new one has not been obtained within a pre-defined interval (e.g., 1 day), a client device 106 temporarily loses its ability to transfer any content to other devices. After an updated CRL has been acquired, the ability to transmit content is regained. In one embodiment, each CRL is an X.509 CRL that conforms to the IETF RFC 3280 standard. A client device 106 inspects the CRL Number parameter and determines if that particular CRL has already been received, so that the CRL does not have to be downloaded again. Because the X.509 CRL encoding positions the CRL Number extension near the end of the CRL, each DER-encoded X.509 CRL is also prefixed by a 4-byte CRL Number at the beginning of the CRL for the sake of efficiency (i.e., easier detection for client device).

Figure 2:
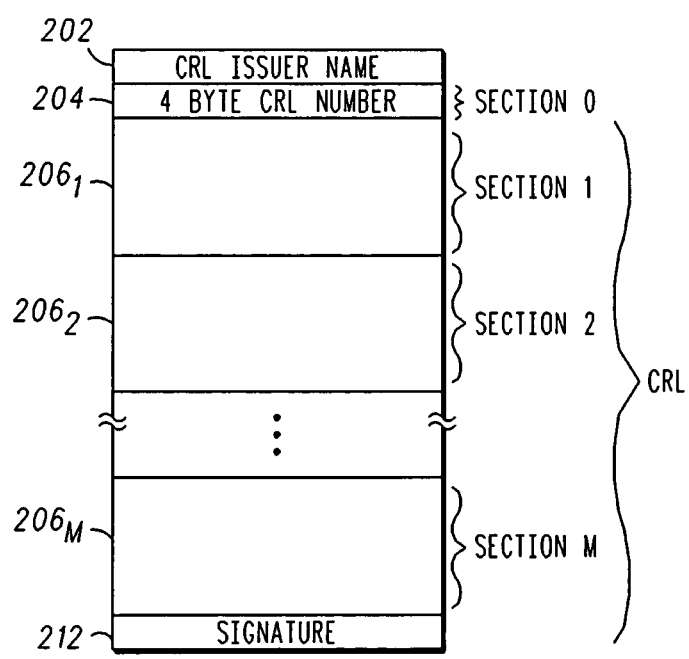
FIG. 2 depicts an Intellectual Property Management and Protection (IPMP) tool that carries an encapsulated CRL.

FIG. 2 depicts an exemplary IPMP Tool Container 200 that is used to encapsulate a CRL. IPMP protocol is defined by MPEG-2 Part 11 in order to carry DRM-related information in an MPEG-2 broadcast stream. IPMP defines a set of MPEG-2 tables that can be included in an MPEG-2 multiplex and can include a construct called an IPMP Container, which may be used to include CRLs. Other standards-based and proprietary containers for broadcasting CRLs are also possible. In one embodiment, the IPMP Tool Container 200 may be used to distribute CRLs in-band over a video transport stream, such as a moving picture experts group (MPEG) broadcast stream (e.g., MPEG-2 broadcast stream) utilizing a specific PID (e.g., PID 3). Each CRL is separated into sections $206_{1...M}$ (e.g., IPMP_Control_Info sections), which are carried by the IPMP Tool Container 200. A single IPMP_Control_Info section can hold up to 4093 bytes of data. Because a memory-constrained device may run out of memory processing large CRL objects, IPRM protocol limits the size of a single CRL to a maximum of 1024 entries, which amounts to approximately 40 kilobytes. Consequently, a CRL may have to be separated into a maximum of 10 sections (i.e., 40 kilobytes divided by 4093 bytes). The IPMP Tool Container 200 comprises a CRL issuer name 202, a CRL Number parameter 204, the CRL itself and a signature 212. The CRL issuer name 202 is a field that identifies the CRL issuer that signed the CRL, which is commonly a Certificate Authority (and is not the CRL Server). The CRL Number parameter 204 and issuer 202 are fields that a client device may inspect in order to determine if the corresponding CRL has been previously received. The signature 212 is normally included as part of each CRL to validate that the CRL has not been modified after being generated by a legitimate CRL issuer named in the CRL.

In order to support a CRL that contains more than 1024 entries, a CRL can be represented as a sequence of CRLs (i.e., CRL "partitions") that are individually signed (i.e., each individual CRL partition contains its own unique signature that is only associated with that one CRL partition). Notably, a sequence of CRLs may be characterized by a number of factors. In one embodiment, all the CRLs in a given sequence must have the same validity period (i.e., the CRLs expire at the same time). Also, the first CRL in a sequence includes an identification number (e.g., a CRL Number extension) with a value that is a multiple of a number such as 0×10000 (65536). Similarly, each successive CRL in the same CRL sequence includes a CRL Number that is incremented by the same constant value (e.g., "1"). Furthermore, the last CRL in a given sequence must have less than the maximum 1024 entries. If the number of revoked certificates is an exact multiple of 1024, then the last CRL in the sequence must be empty. The present invention utilizes the CRL Numbers to signify the grouping of a particular CRL sequence as well as an indicator of an updated revocation list.

For example, in one embodiment, a particular CRL sequence may use a specific "series" of numbers to be used as CRL Numbers. A first sequence of CRLs may employ a 0×10000 series representation wherein the first CRL in the sequence possesses an identification number of 0×10001. Similarly, the second CRL in the sequence would be incremented have an identification number of 0×10002. This method of numbering the identification numbers would continue in like fashion for all the CRLs in a given sequence. However, when a CRL server 114 needs to modify the current revocation list, a new sequence of CRLs is assigned a second series of numbers. For example, the CRL server 114 may assign a 0×20000 series representation to the second sequence of CRLs, wherein the first CRL in the sequence would be numbered 0×20001, the second CRL would be numbered 0×20002, and so on. By changing the entire series of numbers used to identify a modified CRL sequence, the Home KDC 104 and the client devices $106_1 \ldots _N$ in the local network 102 are able to detect an updated CRL. Notably, the device compares the identification number in Section 0 to the last identification number(s) stored in memory and initiates a download of the CRL sequence if a change is detected.

The ESB protocol defines the types of messages in which a CRL may be included. During client provisioning with a Home-KDC, the Init Principal Reply message includes a CRL of Home-KDC certificates (i.e., a list of compromised) Home KDCs and like devices. Similarly, a client device may utilize an AS Request message to request that a CRL be included in a corresponding AS Reply from the Home KDC. Client devices need to request a new CRL if the old revocation list has already expired or is about to expire. In one embodiment, each Home-KDC is required to obtain two types of CRLs: (1) client CRL so that the KDC can verify client certificates, and (2) a Home-KDC CRL that is provided to clients within a local network. In one embodiment, CRLs are distributed to each Home-KDC over an MPEG-2 multiplex using an in-band method. For example, when a client sends a request message such as AS Request to the Home-KDC, it first checks the timestamp on its copy of a Home-KDC CRL to see if it is expired. If that CRL appears to be expired, then the client sets a flag in the request message to indicate to the Home-KDC that it needs a fresh CRL. When preparing a normal response message to the client (e.g., AS Reply), the Home-KDC will also include the latest and non-expired copy of the Home-KDC that it obtained from a CRL Server. Once the client receives the reply from the Home-KDC with an updated CRL, it will use it to verify the status of the Home-KDC certificate.

After detecting an updated revocation list, the Home KDC (or client device) downloads the new CRL and processes the data. Notably, the Home KDC 104 determines if any client device in the local network 102 is listed on the downloaded CRL. If so, the Home KDC records the id of the client device on a "to-be-revoked" list. When a client device with "to-be-revoked" status contacts the Home-KDC, the Home-KDC may be configured to reject any request from such clients. Consequently, the client device will be denied access to all content in the IPRM-protected domain that is not already stored locally.

Figure 3:
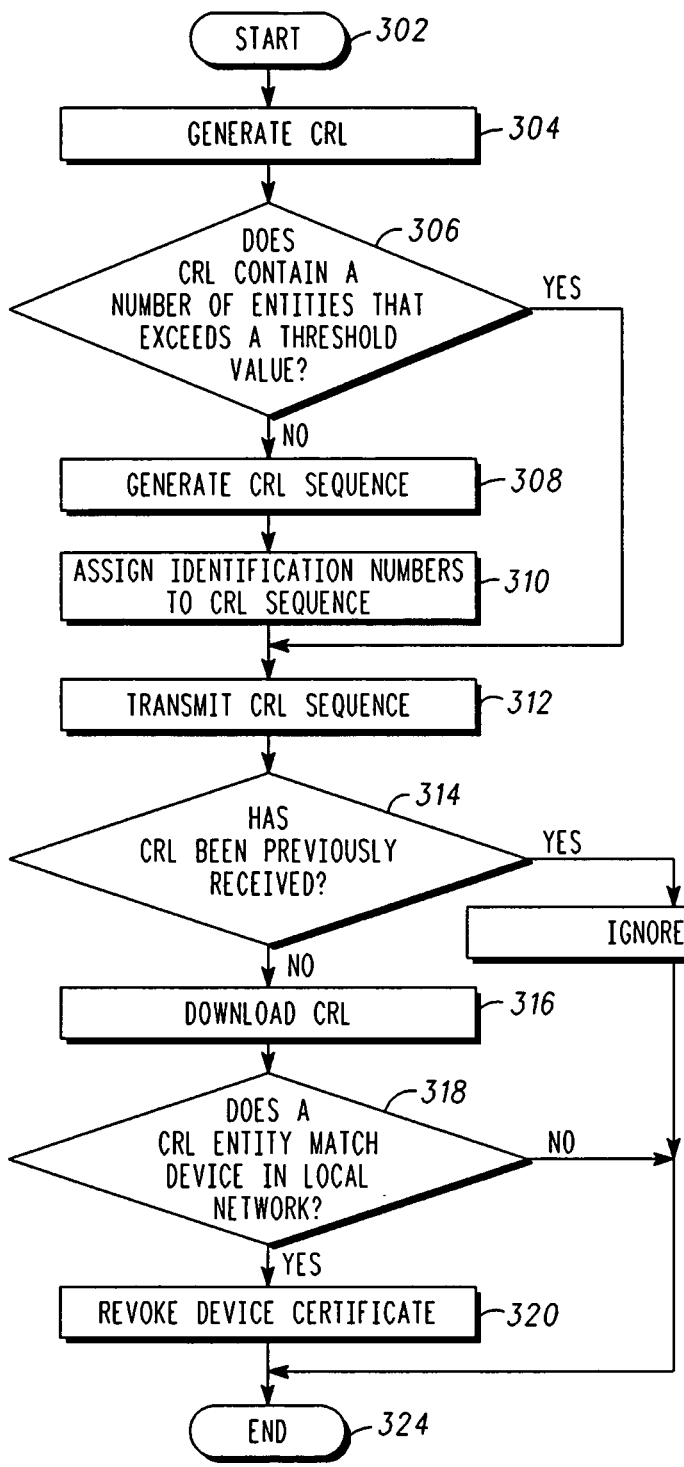
FIG. 3 depicts a method for delivering a certificate revocation list in accordance with the present invention.

FIG. 3 illustrates a method 300 for delivering a CRL to a client device in accordance with the present invention. Method 300 begins at step 302 and proceeds to step 304 where a CRL is generated. In one embodiment, the CRL server 114 creates a revocation list after receiving a list of compromised client devices (and/or Home KDCs) from network operators, equipment manufacturers, or some other reporting entity.

At step 306, a determination is made as to whether the CRL contains a number of entries that exceeds a threshold value. In one embodiment, the CRL server 114 ascertains if the compromised devices entries on the revocation list exceeds 1024. If the threshold value is not exceeded, then the method 300 proceeds to step 312. If the threshold value is exceeded then the method 300 continues to step 308 where a CRL sequence is generated. In one embodiment, the CRL server 114 divides the oversized revocation list into separate CRL "partitions" that contain a maximum of 1024 device entries.

At step 310, identification numbers are assigned to the CRL sequence. Notably, the CRL server 114 assigns each sequence "partition" an identification number that belongs to an identification number series. In one embodiment, the first CRL partition has an identification number that is a multiple of 0×10000 (i.e., 65536). Similarly each sequence CRL in the same sequence has an identification number that increments by 1.

At step 312, the CRL sequence is transmitted. In one embodiment, the CRL server 114 interleaves the CRL sequence into a content transport in-band to a local network. For example, the CRL sequence may be inserted into an MPEG transport stream. Typically, a Home KDC in the local network receives the digital content and CRL sequence. At step 314, a determination is made as to whether the transmitted CRL sequence has been previously received. Notably, the Home KDC 104 ascertains if the CRL is either a previously received CRL or a new and/or modified CRL. In one embodiment, the Home KDC accomplishes this by inspecting the identification number series of the CRL sequence and comparing the value(s) to a recorded value (i.e., a previously received identification number series). If the CRL sequence has already been received on a prior occasion, the method 300 continues to step 322, where the Home KDC will ignore the CRL sequence. Alternatively, the method 300 continues to step 316 where the CRL sequence is downloaded.

At step 318, a determination is made as to whether the CRL sequence contains a client device in the local network. In one embodiment, the Home KDC compares the certificate(s) of the client devices in the local network 102 with the CRL sequence entries. If a match is not found, the method 300 continues to step 324 and ends. If a match is found, the method proceeds to step 320 where the device certificate is revoked. In one embodiment, the Home KDC 104 places the compromised client device on a "to-be-revoked" list that is stored locally. If the Home KDC 104 receives any content requests from the client device in question, the requests will be ignored. The method 300 ends at step 324.

Figure 4:
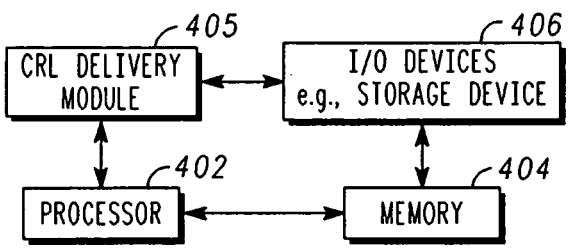
FIG. 4 is a block diagram depicting an exemplary embodiment of a computer suitable for implementing the processes and methods described herein.

FIG. 4 depicts a high level block diagram of a Home KDC or general purpose computer suitable for use in performing the functions described herein. As depicted in FIG. 4, the system 400 comprises a processor element 402 (e.g., a CPU), a memory 404, e.g., random access memory (RAM) and/or read only memory (ROM) and/or persistent memory (Flash), a CRL delivery module 405, and various input/output devices 406 (e.g., storage devices, including but not limited to, a tape drive, a floppy drive, a hard disk drive, a compact disk drive, a receiver, a transmitter, a speaker, a display, a speech synthesizer, an output port, and a user input device (such as a keyboard, a keypad, a mouse, etc.) and the like.

It should be noted that the present invention can be implemented in software and/or in a combination of software and hardware, e.g., using application specific integrated circuits (ASIC), a general purpose computer or any other hardware equivalents. In one embodiment, the CRL delivery module or process 405 can be loaded into memory 404 and executed by processor 402 to implement the functions as discussed above. As such, the present CRL delivery module 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for delivering a revocation list, comprising:
by one or more processors:
partitioning said revocation list to form a first certificate revocation list (CRL) sequence if a number of entries of said revocation list exceeds a predetermined value;
assigning individual identification numbers belonging to a first identification number series to partitions of said first CRL sequence, where the individual identification numbers each comprise a numerical value from which a client can determine whether the partitions are part of the same CRL sequence, and can determine whether the CRL sequence has been received in its entirety; and
interleaving said first CRL sequence into a first content transport stream;
where each of said partitions of said first CRL sequence includes a unique signature that is verifiable independent of any other of said partitions.

2. The method of claim 1, further comprising:
creating a second CRL sequence to replace said first CRL sequence if said first CRL sequence requires a modification;
assigning individual identification numbers belonging to a second identification number series to partitions of said second CRL sequence; and
interleaving said second CRL sequence into a second content transport stream.

3. The method of claim 2, wherein said modification comprises at least one of: an addition of at least one entry to said revocation list or a deletion of at least one entry from said revocation list.

4. The method of claim 1, wherein said first CRL sequence is encapsulated by an Intellectual Property Management and Protection (IPMP) tool container.

5. The method of claim 1, wherein said first content transport stream is broadcasted to at least one device via a communications network.

6. The method of claim 1, wherein a last partition of said first CRL sequence comprises less entries than an exact multiple of said predetermined value.

7. The method of claim 1, further comprising:
appending an empty partition to an end of said first CRL sequence if said number of said entries is an exact multiple of said predetermined value.

8. The method of claim 1, wherein said each partition of said first CRL sequence includes an identical validity period.

9. The method of claim 1, wherein said content transport stream comprises a moving picture experts group (MPEG) transport stream.

10. The method of claim 1, wherein all of said partitions of said first CRL sequence are acquired by a single device.

11. A non-transitory computer readable medium having stored thereon instructions that, when executed by a processor, causes the processor to perform a method for delivering a revocation list, comprising:
partitioning said revocation list to form a first certificate revocation list (CRL) sequence if a number of entries of said revocation list exceeds a predetermined value;
assigning individual identification numbers belonging to a first identification number series to partitions of said first CRL sequence, where the individual identification numbers each comprise a numerical value from which a client can determine whether the partitions are part of the same CRL sequence, and can determine whether the CRL sequence has been received in its entirety; and
interleaving said first CRL sequence into a first content transport stream;
where each of said partitions of said first CRL sequence includes a unique signature that is verifiable independent of any other of said partitions.

12. The computer readable medium of claim 11, further comprising:
creating a second CRL sequence to replace said first CRL sequence if said first CRL sequence requires a modification;
assigning individual identification numbers belonging to a second identification number series to partitions of said second CRL sequence; and
interleaving said second CRL sequence into a second content transport stream.

13. The computer readable medium of claim 11, wherein said first CRL sequence is encapsulated by an Intellectual Property Management and Protection (IPMP) tool container.

14. The computer readable medium of claim 11, wherein said first content transport stream is broadcasted to at least one device via a communications network.

15. The computer readable medium of claim 11, further comprising:
appending an empty partition to an end of said first CRL sequence if said number of said entries is an exact multiple of said predetermined value.

16. The computer readable medium of claim 11, wherein said each partition of said first CRL sequence includes an identical validity period.

17. The computer readable medium of claim 11, wherein said content transport stream comprises a moving picture experts group (MPEG) transport stream.

18. The computer readable medium of claim 11, wherein said modification comprises at least one of: an addition of at least one entry to said revocation list or a deletion of at least one entry from said revocation list.

19. An apparatus for delivering a revocation list, comprising:
a hardware processor:
a memory;
a certificate revocation list delivery module comprising instructions stored on a non-transitory computer readable medium, said instructions being executable by the processor when loaded into the memory, the instructions configured to cause the hardware processor to:
partition said revocation list to form a first certificate revocation list (CRL) sequence if a number of entries of said revocation list exceeds a predetermined value;
assign individual identification numbers belonging to a first identification number series to partitions of said first CRL sequence, where the individual identification numbers each comprise a numerical value from which a client can determine whether the partitions are part of the same CRL sequence, and can determine whether the CRL sequence has been received in its entirety; and
interleave said first CRL sequence into a first content transport stream;
where each of said partitions of said first CRL sequence includes a unique signature that is verifiable independent of any other of said partitions.

20. The apparatus of claim 19, further comprising additional instructions configured to cause the hardware processor to:

create a second CRL sequence to replace said first CRL sequence if said first CRL sequence requires a modification;

assign individual identification numbers belonging to a second identification number series to partitions of said second CRL sequence; and interleave said second CRL sequence into a second content transport stream.

21. The apparatus of claim 19, wherein said first CRL sequence is encapsulated by an Intellectual Property Management and Protection (IPMP) tool container.

* * * * *